US012783943B2

(12) United States Patent
Shu et al.

(10) Patent No.: US 12,783,943 B2
(45) Date of Patent: Nov. 3, 2026

(54) FEATURE RECOMMENDATIONS FOR MACHINE LEARNING MODELS BASED ON FEATURE-MODEL CO-OCCURRENCES

(71) Applicant: Maplebear Inc., San Francisco, CA (US)

(72) Inventors: Guanghua Shu, Sunnyvale, CA (US); Reza Sadri, Irvine, CA (US); Jacob Jensen, Metuchen, NJ (US); Sahil Khanna, San Jose, CA (US)

(73) Assignee: Maplebear Inc., San Francisco, CA (US)

( * ) Notice: Subject to any disclaimer, the term of this patent is extended or adjusted under 35 U.S.C. 154(b) by 792 days.

(21) Appl. No.: 18/140,203

(22) Filed: Apr. 27, 2023

(65) Prior Publication Data

US 2024/0362523 A1 Oct. 31, 2024

(51) Int. Cl.
*G06N 20/00* (2019.01)

(52) U.S. Cl.
CPC .................................... *G06N 20/00* (2019.01)

(58) Field of Classification Search
CPC ................................ G06N 20/00; G06N 5/022
See application file for complete search history.

(56) References Cited

U.S. PATENT DOCUMENTS

| | | | | |
|---|---|---|---|---|
| 10,671,672 | B1 * | 6/2020 | Eksombatchai | G06F 16/435 |
| 10,943,407 | B1 * | 3/2021 | Morgan | G16H 15/00 |
| 2019/0220695 | A1 * | 7/2019 | Nefedov | G06N 20/00 |
| 2019/0317965 | A1 * | 10/2019 | Remis | G06F 16/3322 |
| 2021/0064928 | A1 * | 3/2021 | Narisetty | G06F 18/245 |
| 2021/0081706 | A1 * | 3/2021 | Kiang | G06F 18/231 |
| 2021/0406779 | A1 * | 12/2021 | Hu | G06N 20/20 |
| 2022/0050695 | A1 * | 2/2022 | Gajendran | G06F 8/34 |
| 2022/0215146 | A1 * | 7/2022 | Lin | G06N 20/00 |
| 2024/0013582 | A1 * | 1/2024 | Mukherjee | F02D 29/02 |

* cited by examiner

*Primary Examiner* — Michael C. Lee
(74) *Attorney, Agent, or Firm* — Fenwick & West LLP

(57) ABSTRACT

A system maintains a data store for managing machine-learning (ML) models and features that are used by the models. The system generates a graph including nodes for each model and a node for each feature, and edges linking models and features that are used by the models. For a new model to be trained, the system receives a proposed feature corresponding to a node in the graph, and identifies one or more candidate features corresponding to nodes in the graph based in part on relevancy scores between the proposed feature with other features corresponding to nodes in the graph. The system presents in a user interface a suggestion to use one or more candidate features with the new model. Responsive to receiving a user selection of at least one candidate feature, the system causes the new model to be trained using the selected candidate feature and the proposed feature.

14 Claims, 11 Drawing Sheets

240

| | F0 | F1 | F2 | F3 | F4 | F5 | F6 | F7 | F8 | F9 | F10 | F11 | F12 | F13 | F14 | F15 |
|---|---|---|---|---|---|---|---|---|---|---|---|---|---|---|---|---|
| F0 | M0 | M0 (1) | M0 (1) | M0 (1) | M0 (1) | M0 (1) | M0 (1) | 0 | M0 (1) | 0 | 0 | 0 | 0 | 0 | 0 | 0 |
| F1 | M0 (1) | M0 | M0 (1) | M0 (1) | M0 (1) | M0 (1) | M0 (1) | 0 | M0 (1) | 0 | 0 | 0 | 0 | 0 | 0 | 0 |
| F2 | M0 (1) | M0 (1) | M0 | M0 (1) | M0 (1) | M0 (1) | M0 (1) | 0 | M0 (1) | 0 | 0 | 0 | 0 | 0 | 0 | 0 |
| F3 | M0 (1) | M0 (1) | M0 (1) | M0 | M0 (1) | M0 (1) | M0 (1) | 0 | M0 (1) | 0 | 0 | 0 | 0 | 0 | 0 | 0 |
| F4 | M0 (1) | M0 (1) | M0 (1) | M0 (1) | M0 M1 | M0 (1) | M0 (1) | 0 | M0 M1 (2) | 0 | 0 | 0 | 0 | 0 | 0 | 0 |
| F5 | M0 (1) | M0 (1) | M0 (1) | M0 (1) | M0 (1) | M0 | M0 (1) | 0 | M0 (1) | 0 | 0 | 0 | 0 | 0 | 0 | 0 |
| F6 | M0 (1) | M0 (1) | M0 (1) | M0 (1) | M0 (1) | M0 (1) | M0 M2 | 0 | M0 M2 (2) | 0 | 0 | 0 | 0 | 0 | 0 | 0 |
| F7 | 0 | 0 | 0 | 0 | 0 | 0 | 0 | M3 | 0 | 0 | 0 | 0 | M3 (1) | 0 | 0 | 0 |
| F8 | M0 (1) | M0 (1) | M0 (1) | M0 (1) | M0 M1 (2) | M0 (1) | M0 M2 (2) | 0 | M0 M1 M2 M4 | M2 (1) | M2 M4 (2) | M4 (1) | 0 | M4 (1) | 0 | 0 |
| F9 | 0 | 0 | 0 | 0 | 0 | 0 | 0 | 0 | M2 (1) | M2 | M2 (1) | 0 | 0 | 0 | 0 | 0 |
| F10 | 0 | 0 | 0 | 0 | 0 | 0 | 0 | 0 | M2 M4 (2) | M2 (1) | M2 M4 | M4 | 0 | 0 | 0 | 0 |
| F11 | 0 | 0 | 0 | 0 | 0 | 0 | 0 | 0 | M4 (1) | 0 | M4 (1) | M4 | 0 | 0 | 0 | 0 |
| F12 | 0 | 0 | 0 | 0 | 0 | 0 | 0 | M3 (1) | 0 | 0 | 0 | 0 | M3 M5 | 0 | 0 | M5 (1) |
| F13 | 0 | 0 | 0 | 0 | 0 | 0 | 0 | 0 | M4 (1) | 0 | 0 | 0 | 0 | M4 | M4 (1) | 0 |
| F14 | 0 | 0 | 0 | 0 | 0 | 0 | 0 | 0 | 0 | 0 | 0 | 0 | 0 | M4 (1) | M4 | 0 |
| F15 | 0 | 0 | 0 | 0 | 0 | 0 | 0 | 0 | 0 | 0 | 0 | 0 | M5 (1) | 0 | 0 | M5 |

FIG. 4

FEATURE RECOMMENDATIONS FOR MACHINE LEARNING MODELS BASED ON FEATURE-MODEL CO-OCCURRENCES

BACKGROUND

In machine learning (ML), a feature is an individual property or characteristic of a phenomenon that is used to train an ML model. Features may be numeric and/or structural, such as strings or graphs. Choosing informative, discriminating, and/or independent features is an important step of effective training of an ML model.

As ML becomes prevalent, many organizations have a centralized feature management system to provide features for ML models. Such a system usually contains tens of thousands of features, if not more. These features can be redundant and too large to be managed for training a new ML model. Further, for a new ML model, not all of these tens of thousands of features are relevant. Training models with irrelevant features would consume more computation power and result in less accurate models. Therefore, a preliminary step in many machine learning processes includes selecting a subset of features to facilitate learning. The selection of a subset of features often requires intuition and knowledge of domain experts with the experimentation of multiple possibilities.

SUMMARY

An existing feature management system may recommend features based on the popularity of features used in existing machine learning (ML) models. The popularity-based feature recommendation is somewhat effective, but it is limited to related models. Since each model has a different purpose, certain popular features may not be relevant to some other models.

One or more embodiments described herein solve the above-described problem by maintaining a data store accessible by a feature management system. The data store contains a plurality of ML models and input features used by the ML models. The feature management system generates a graph based on the ML models and the features. The graph includes nodes and edges. Each node represents an ML model or a feature used for training an ML model. Each edge links a model and a feature that is used by the ML model.

For a new ML model to be trained, a user may propose a feature that is to be used to train the new ML model. Responsive to receiving the proposed feature, the feature management system identifies one or more candidate features from the graph based on relevancy scores between the proposed feature with other features corresponding to nodes in the graph. Each relevancy score is determined based on whether the proposed feature and another feature are used by one or more common ML models corresponding to nodes in the graph.

Various methods may be used to determine the relevancy scores. Such methods include (but are not limited to) a Personalized PageRank method, a Matrix Factorization method, and a Random Walk method.

The feature management system presents in a user interface a suggestion to use one or more of the candidate features with the new ML model. Receiving the suggestion of the candidate features, the user can select at least one candidate feature from the user interface. Responsive to receiving a user selection of at least one candidate feature, the feature management system causes the new ML model to be trained using a set of input features, including the selected candidate feature and the proposed feature.

BRIEF DESCRIPTION OF THE DRAWINGS

FIG. 4 illustrates an example embodiment of a model-feature interaction matrix based on the graph of FIG. 3, in accordance with one or more embodiments.

DETAILED DESCRIPTION

Figure 1:
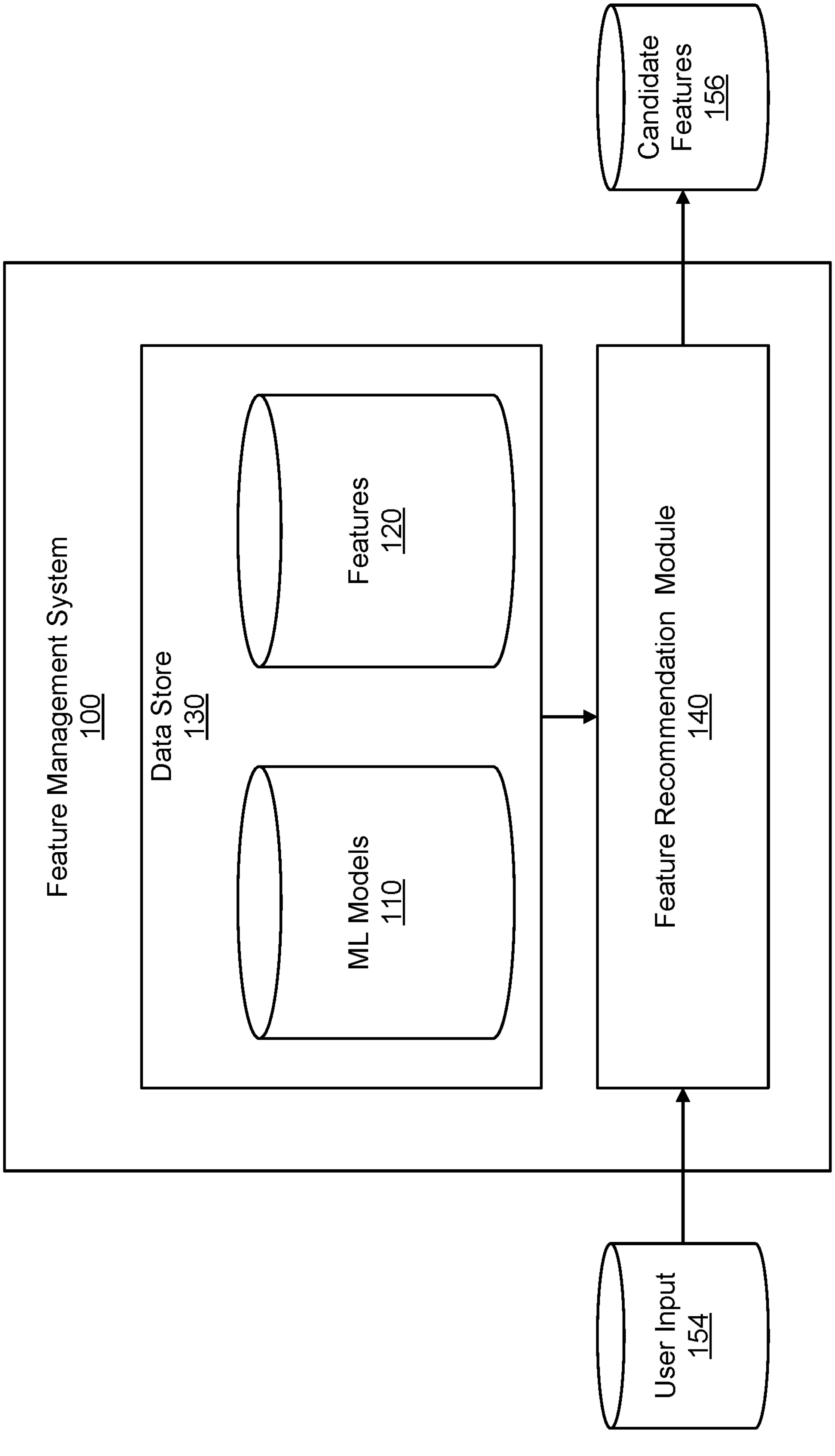
FIG. 1 illustrates an example feature management system for managing a plurality of machine learning (ML) models and a plurality of features used to train the plurality of ML models, in accordance with one or more embodiments.

The embodiments described herein include a feature management system that provide feature discovery or recommendations to give users inspiration for more features in addition to some initial features based on their intuition or metadata about a new machine learning (ML) model that is to be trained. The feature management system not only allows relevant features to be included in training new ML models or retraining existing ML models, but also encourages feature sharing to avoid feature re-computation.

An existing feature management system may recommend features based on the popularity of features used in existing models. The popularity-based feature recommendation is somewhat effective, but it is limited to related models. Since each model has a different purpose, certain popular features may not be related to some models.

The embodiments described herein solve the above-described problem by allowing users to propose some features for a new ML model based on their intuitions, and recommending additional features based on the user-proposed features. To make the recommended features more relevant, once the user proposed some features for the new ML model, the system is able to recommend the most relevant features existing in the system based on the relevancies between the proposed feature and other features in the system. Embodiments described herein provide at least two following benefits: (1) helping build a better model with a more comprehensive feature list, and (2) reducing the potential re-computation of certain features.

The embodiments described include a feature management system for managing a plurality of ML models and a plurality of features that are used by the plurality of ML models. The feature management system maintains a data store that stores the plurality of ML models and the plurality of input features. The feature management system generates a graph (also referred to as a bipartite graph) based on the ML models and the features. The graph includes nodes and edges. Each node represents an ML model or a feature used for training an ML model. Each edge links a model and a feature that is used by the ML model.

For a new ML model to be trained, a user may propose a feature that is to be used to train the new ML model. Responsive to receiving the proposed feature, the feature management system identifies one or more candidate features from the graph based on relevancy scores between the proposed feature with other features corresponding to nodes in the graph. Each relevancy score is determined based on whether the proposed feature and another feature are used by one or more common ML models corresponding to nodes in the graph.

Various methods may be used to determine the relevancy scores. Such methods include (but are not limited to) a Personalized PageRank method, a Matrix Factorization method, and a Random Walk method. Both of the Personalized PageRank method and Matrix Factorization method use a model-feature interaction matrix that records relevancies scores of each feature pair to identify candidate features. In some embodiments, the feature management system generates the model-feature interaction matrix based on the graph, and traverses at least a portion of the model-feature interaction matrix (e.g., a row or a column of the matrix) to identify candidate features.

Unlike the Personalized PageRank method or the Matrix Factorization method, the Random Walk method uses random walks starting from a node corresponding to a proposed feature to randomly visit neighboring feature nodes, and identifies candidate features based on the randomly visited neighboring feature nodes. In some situations, the Personalized Page Rank and Matrix Factorization methods may become computationally expensive due to the large size of the model-feature interaction matrix, the Random Walk method can be implemented to reduce computation cost or increase computation speed. However, due to the randomness, some relevant feature may not be identified if the distance of the random walk(s) is not sufficiently long, or a total number of random walks is not sufficiently large, resulting in lower accuracy. Note, any one of the these three methods may be implemented, depending on the size of the graph and/or the desired accuracy of the recommendations.

In some embodiments, the feature management system presents in a user interface a suggestion to use one or more of the candidate features with the new ML model. Receiving the suggestion of the candidate features, the user can select at least one candidate feature from the user interface. Responsive to receiving a user selection of at least one candidate feature, the feature management system causes the new ML model to be trained using a set of input features, including the selected candidate feature and the proposed feature.

The feature management system described herein not only can provide users initial feature recommendations, but also can help reinforcing training feedback loops. Feedback from training experiments indicates how to improve deployed models and/or how to improve the feature recommendation process. For example, a feature management system manages a set of existing models and features. A new feature may be created, or an existing feature is re-examined for impact in a new model. An experiment quantifies the impact of integrating the new feature into an existing model, integrating an existing feature into a new model, or integrating a new feature into a new model. This impact can be broken down into separate metrics.

For example, in an e-commerce platform, the metrics may include (but are not limited to) add-to-cart rate, user retention rate, and application latency. In e-commerce domain, any given ML model tends to target specific metrics. For example, search ranking aims to improve cart-add rates; ads aim to improve clickthrough rates. Each metric may add a reinforcing factor to the bipartite graph that already exists. As such, each of these metrics is targeted differently in different domains of the e-commerce platform. Different metric impacts can be added into metadata of features and models to help improve the feature relevance prediction approaches. Metrics can be further driven by the updated model. The result provides a signal to improve recommendations for new features and new models.

FIG. 1 illustrates an example feature management system 100, in accordance with one or more embodiments. Feature management system 100 maintains a data store 130 that stores data associated with a plurality of ML models 110 and data associated with a plurality of features 120 that are used to train the ML models 110. The feature management system 100 also includes a feature recommendation module 140 configured to receive user input 154. The user input 154 may include (but is not limited to) a proposed feature to be used for a new ML model or metadata about the new ML model. Based on the user input, the feature recommendation module 140 suggests one or more candidate features 156. In some embodiments, the feature management system 100 further includes a user interface, presenting the suggestion to a user. The user can select one or more of the candidate features via the user interface. The feature management system 100 then causes the new ML model to be trained using a set of input features, including the selected candidate features and the proposed features.

Figure 2:
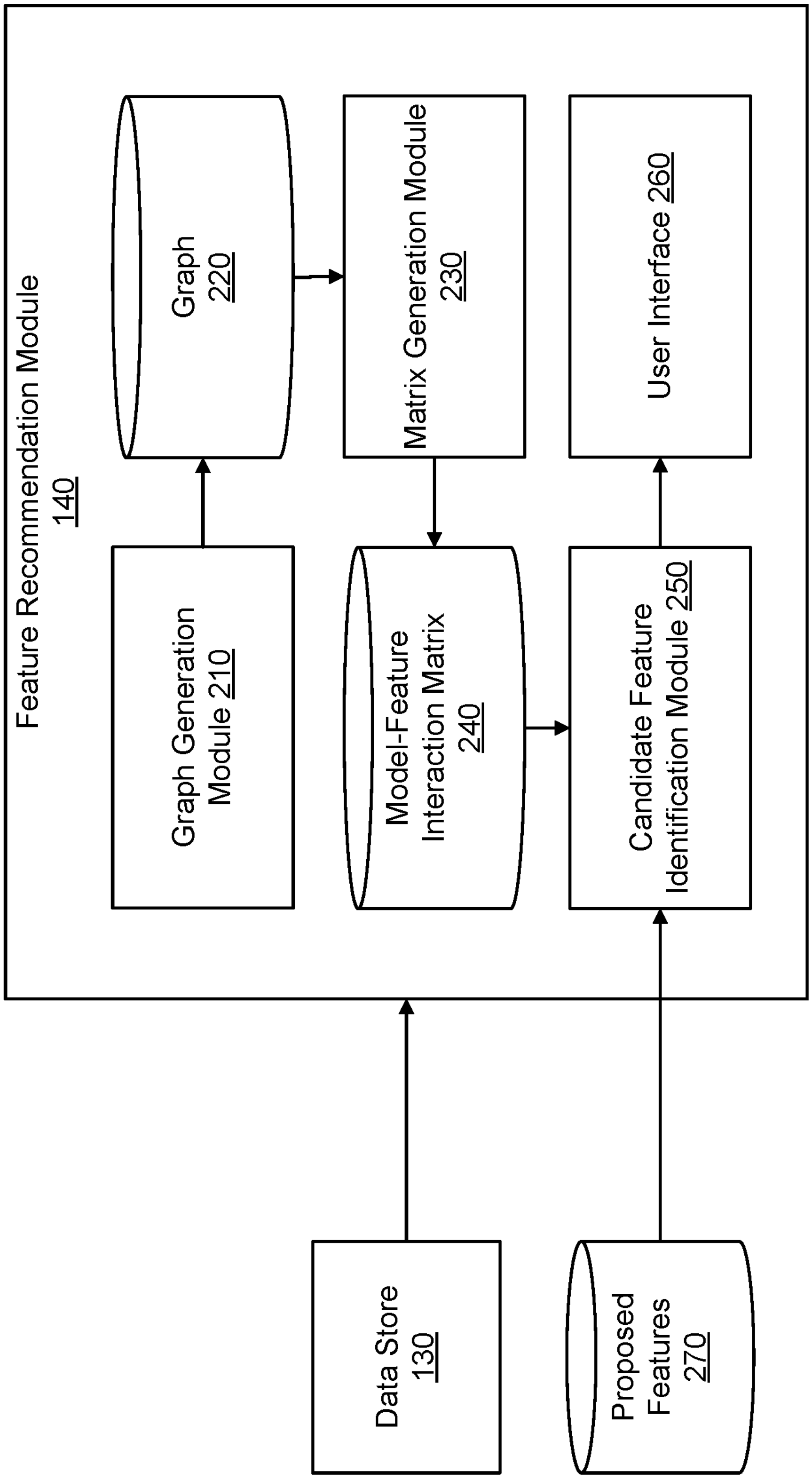
FIG. 2 illustrates an example embodiment of the feature recommendation module 140, in accordance with one or more embodiments.

FIG. 2 illustrates an example embodiment of the feature recommendation module 140, in accordance with one or more embodiments. The feature recommendation module 140 includes a graph generation module 210, a matrix generation module 230, a candidate feature identification module 250, and a user interface 260. Alternative embodiments may include more, fewer, or different modules from those illustrated in FIG. 2. Functions of different modules may be consolidated into a single module or separate into additional modules.

The graph generation module 210 has access to the data store 130 that stores data associated with the ML models and features used by the ML models. The graph generation module 210 is configured to generate a graph 220 based on the data associated with the ML models 110 and features 120. The graph 220 includes multiple nodes and edges. Each node represents an ML model or a feature used for training at least one ML model. Each edge links a model and a feature that is used by the ML model.

The matrix generation module 230 is configured to generate a model-feature interaction matrix 240 based on the graph 220. The model-feature interaction matrix 240 records a relevancy score for a pair of features based on a number of common ML models that use both the features in the pair. In some embodiments, for any given pair of features Fi and Fj, a relevancy score is computed and recorded in the model-feature interaction matrix 240. In some embodiments, when Fi and Fj are both used in training k common ML models, the relevancy score for feature pair Fi and Fj is k, where k is an integer no fewer than 0. For example, if features Fi and Fj share no common ML model, the relevancy score is 0; if features Fi and Fj share 3 common ML models, the relevancy score is 3. The number of common ML models shared by a feature pair indicates how relevant these features are. Generally, the greater the number of common ML models shared by the pair of features, the more relevant the pair of features are.

For a new ML model to be trained, a user may input one or more proposed features based on intuition or experience. The candidate feature identification module 250 receives the proposed features, and identifies one or more candidate features from the model-feature interaction matrix 240 based on the relevancy scores between the candidate features and the other features in the matrix 240. The user interface 260 presents the identified candidate features to the user. For example, if features Fi and Fj are sufficiently relevant based on their relevancy score, the candidate feature identification module 250 selects feature Fi when the proposed feature is Fj, and vice versa.

When more than one proposed feature is input by the user, for each of the proposed features, the candidate feature identification module 250 may identifies a separate set of candidate features. For example, if the user input two proposed features Fi and Fj, for the first proposed feature Fi, the candidate feature identification module 250 identifies a first set of candidate features based on their relevancies with the first proposed feature Fi; and for the second proposed feature Fj, the candidate feature identification module 250 identifies a second set of candidate features based on their relevancies with the second proposed feature Fj. The user interface 260 presents both the first and second set of candidate features to the user. In some embodiments, the user interface 260 may also present the relevancies scores corresponding to the proposed features.

In some embodiments, the candidate feature identification module 250 identifies candidate features that have relevancy scores greater than a threshold score. Only the features with relevancy scores greater than the threshold score are presented to the user. Alternatively, or in addition, the candidate feature identification module 250 sorts features based on their relevancy scores, and identifies a threshold number or a maximum number of features with the highest relevancy scores. Only the threshold number or the maximum number of features with the highest relevancy scores are presented to the user. In some embodiments, the threshold score and/or the threshold number may be set by the feature management system 100. Alternatively, or in addition, the threshold score and/or the maximum number may be set or modified by users.

Figure 3:
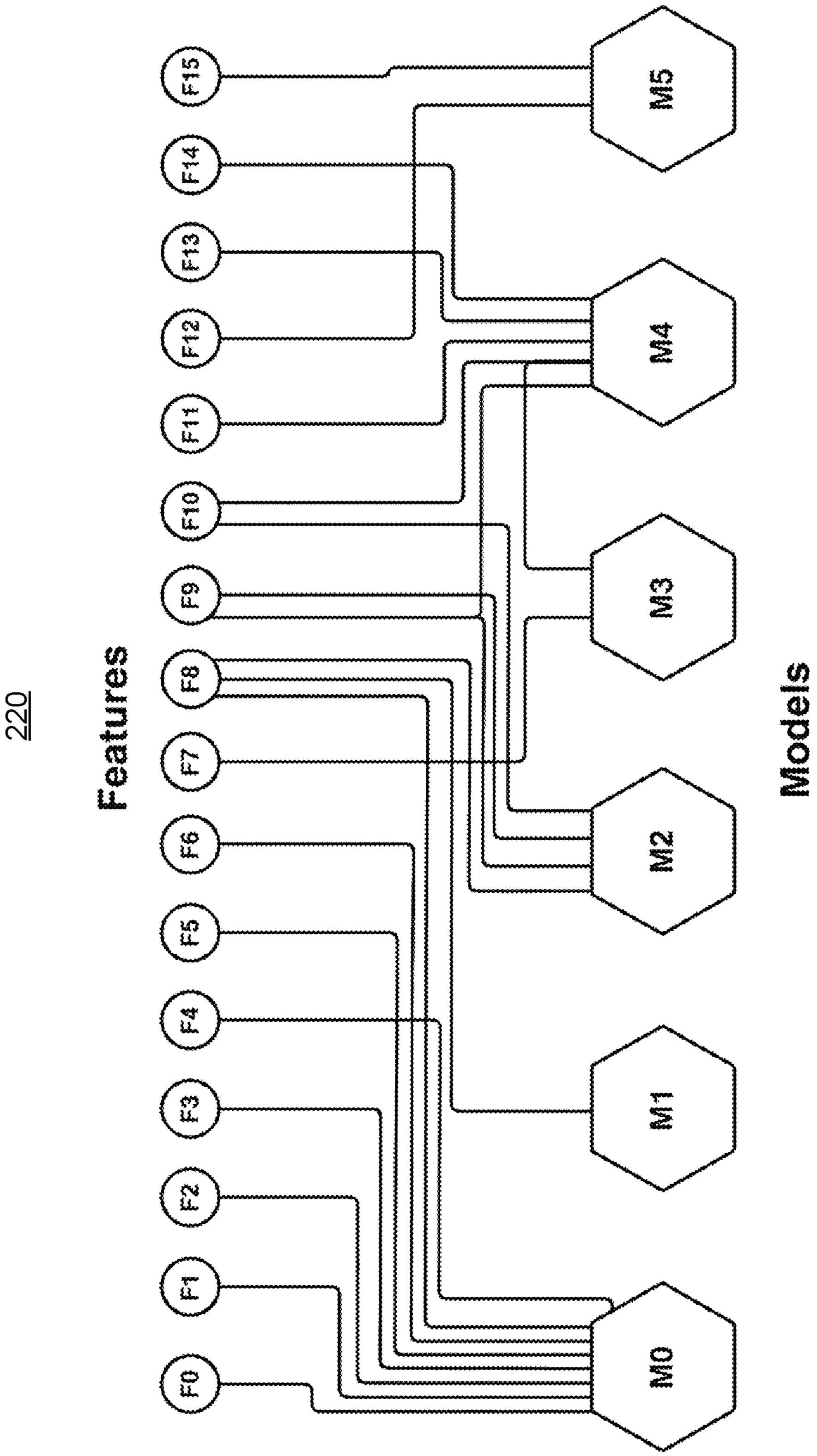
FIG. 3 illustrates an example graph generated based on a plurality of ML models trained using a plurality of features, in accordance with one or more embodiments.

FIG. 3 illustrates an example graph 220 generated based on five ML models trained using 16 features, in accordance with one or more embodiments. The graph 220 includes a plurality of nodes and a plurality of edges. Graph 220 (also referred to as a bipartite graph) includes two types of nodes, namely model nodes M0-M5 and feature nodes F0-F15. Each model node M0-M5 represents an ML model, and each feature node F0-F15 represents a feature used to train one of the ML models. Each edge links a model and a feature that is used to train the ML model. For example, the edge linking nodes F0 and M0 represents that feature F0 is used to train ML model M0. As illustrated, model M0 uses features F0-F6 and F8; model M2 uses features F4 and F8-F10; model M3 uses features F7 and F12; model M4 uses features F8, F10-F11, and F13-F14; model M5 uses features F12 and F15.

Each node in the graph 220 has some importance. Importance gets evenly split among all edges and pushed to neighbors. In some embodiments, relevancy between a pair of features may be measured based on a number of common ML models they share. For example, features F0 and F15 share no common ML model, thus, a relevancy score between features F0 and F15 may be set as 0. As another example, features F8 and F6 share two common ML models M0 and M2, thus, a relevancy score between features F8 and F6 may be set as 2. Multiple methods can be used to estimate relevancy between features, such as (but not limited to) (1) a Personalized PageRank method, (2) a Matrix Factorization method, and (3) a Random Walk method. Each of these three methods is further described below with respect to FIGS. 4-5.

Personalized Pagerank Method

The Personalized PageRank method includes generating an adjacency matrix (also referred to as model-feature interaction matrix 240) based on the graph 220, wherein the model-feature interaction matrix includes a relevancy score for any given pairs of features based on a number of edges in the graph with a model in common. Notably, features connected to the same model or relevant models are likely to be relevant to each other. For example, features F0-F6 and F8 are all connected to M0; features F4 and F8 are both connected to models M0 and M1; features F6 and F8 are both connected to models M0 and M8; features F8 and F10 are both connected to models M2 and M4; and so on and so forth. Such model-feature interactions may be recorded in the model-feature interaction matrix.

FIG. 4 illustrates an example model-feature interaction matrix 240 generated based on graph 220 of FIG. 3, in accordance with one or more embodiments. The rows and columns of the model-feature interaction matrix 240 are labeled with graph nodes, i.e., features F0-F15. The ML model(s) corresponding to a row feature and column feature indicates that the row feature and the column feature share the common models; the number (also referred to as "relevancy score") corresponding to the row feature and column feature indicates relevancy of the row feature and the column feature. The relevancy score is determined based on a number of the common model shared by the row feature and column feature. For example, the ML model corresponding to features F0 and F1 is model M0, which is only one model. Thus, the relevancy score corresponding to features F0 and F1 is 1. As another example, the ML models corresponding to features F4 and F8 are models M0 and M1; thus, the relevancy score of features F4 and F8 is 2. Similarly, any given row feature and column feature correspond to a relevancy score. If there is no common model shared by the row feature and column feature, the relevancy score is 0. For example, features F0 and F7 share no common model; thus, the relevancy score of features F0 and F7 is 0.

Based on the model-feature interaction matrix 240, the candidate feature identification module 250 can identify candidate features for any proposed feature based on their relevancy scores associated with the proposed feature. In some embodiments, the candidate feature identification module 250 identifies a row or a column that includes the proposed feature, and traverses the row or the column to obtain all the relevancy scores in the row or the column. The model-feature interaction matrix 240 then identifies candidate features in the row or the column with relevancy scores no less than a predetermined threshold. For example, if a proposed feature is feature F8, assuming the threshold for relevancy score is 2, the candidate feature identification module 250 would select features F4, F6, and F10 as candidate features, because each of these features has a relevancy score of 2.

Alternatively, or in addition, the candidate feature identification module 250 selects no more than a threshold number of candidate features with the highest relevancy scores. For example, if a proposed feature is feature F8, assuming the threshold number is 3, the candidate feature identification module 250 would also select features F4, F6, and F10 as candidate features, because these features are the top three features with the highest relevancy scores.

If a user inputs more than one proposed feature, the candidate feature identification module 250 would repeat the same process for each of the proposed features to identify a separate set of candidate features. In some embodiments, once a user is presented with all the candidate features, the user can select any number of the candidate features to be used to train the new model. Alternatively, in some embodiments, the feature management system 100 automatically uses all the candidate features and the proposed features to train the new model.

Matrix Factorization Method

The Matrix Factorization method uses matrix factorization techniques to decompose a model-feature interaction matrix (e.g., a model-feature interaction matrix 240), denoted as $A \in R^{m \times n}$, into (1) a model matrix, denoted as $M \in R^{m \times d}$, where each row i of the Model matrix is a vector representation of model i; and (2) a feature matrix, denoted as $F \times R^{n \times d}$, where each row j of the feature matrix is a vector representation of feature j. After the decomposition, the relevancy search techniques among vectors can be used to find relevant features to any given proposed feature Fx, and recommend such relevant features for a new ML model Mx.

In some embodiments, a distance between two feature vectors in a feature space may be computed, and the distance is used as a relevancy score between the two features corresponding to the feature vectors. Each proposed feature corresponds to a proposed feature vector, and candidate features are identified based on the distances between the proposed feature vector and other feature vectors in the feature space. In some embodiments, the candidate feature vectors are identified to be within a threshold distance from the proposed feature vector. Alternatively, or in addition, the candidate feature vectors are identified to include a threshold number of feature vectors that are the closest to the proposed feature vector.

Random Walk Method

In some situations, the Personalized Page Rank and Matrix Factorization methods may become computationally too expensive due to the large matrix size, the Random Walk method can be implemented to reduce computation cost or increase computation speed. Generally, a random walk is a random process that describes a path that includes a succession of random steps on the graph 220 or matrix 240.

For a given proposed feature Fx of a new ML model, a random walk can be simulated as follows: First, a random walk starts from feature Fx. A first step is from feature Fx to a first random neighbor node. Referring back to FIG. 3, feature nodes are directly connected to ML model nodes, but not other feature nodes. Thus, the first random neighbor node is one of the ML model nodes connected to the feature node Fx. For each of the ML model nodes, a probability is BETA. After that, a second step is from the random neighbor node (i.e., the ML model node) to a second random neighbor node. Again, ML model nodes are directly connected to feature nodes, but not other ML model nodes. Thus, the second random neighbor node is a feature node. This process repeats for a predetermined number of times, and the visit frequency of each random feature node is recorded.

Pseudo code for the above algorithm is shown below:

```
feature = fx
for _ in range(num_of_steps):
  model = feature.get_random_neighbor( )
  feature = model.get_random.neighbor( )
  feature.num_of_visit += 1
    if random( ) < BETA:
      feature = fx
```

For example, a user inputs feature F8 as a proposed feature. A random walk starts from feature node F8. Feature node F8 is linked to model nodes M0, M1, M2, and M4. Thus, a first step from feature node F8 may randomly visit one of the model nodes M0, M1, M2, or M4. For each of the model nodes, M0, M1, M2, or M4, a probability to visit that model node is 0.25 (=1/4). Assuming the first step from feature F8 visits model node M4, a second step starts from model node M4. Model node M4 is linked to feature nodes F8, F10, F11, F13, and F14. Thus, the second step from model node M4 may randomly visit one of feature nodes F8, F10, F11, F13, or F14. For each of the feature nodes F8, F10, F11, F13, and F14, a probability to visit that model node is 0.2 (=1/5). Assuming the second step from model node M4 visits feature node F10, one count for feature node F10 is recorded. A third step starts from feature node F10. This process repeats as many times as necessary to allow a sufficient number of neighboring feature nodes to be visited. For each visited neighboring feature nodes, a total number of visits is counted and recorded. The greater the total number of visits of a neighboring feature node indicates a greater relevancy or shorter distance to the proposed feature node.

In some embodiments, multiple random walks are performed, each starting at the node corresponding to the proposed Feature Fx. The feature node with the highest visit count is deemed to have the highest relevancy to feature Fx. The candidate feature identification module 250 selects the feature nodes with a visit count that is greater than a threshold as relevant features to the proposed feature Fx, and suggest the selected features to the user. Alternatively, or in addition, a threshold number of visited neighboring nodes with highest visit counts are identified.

Figure 5:
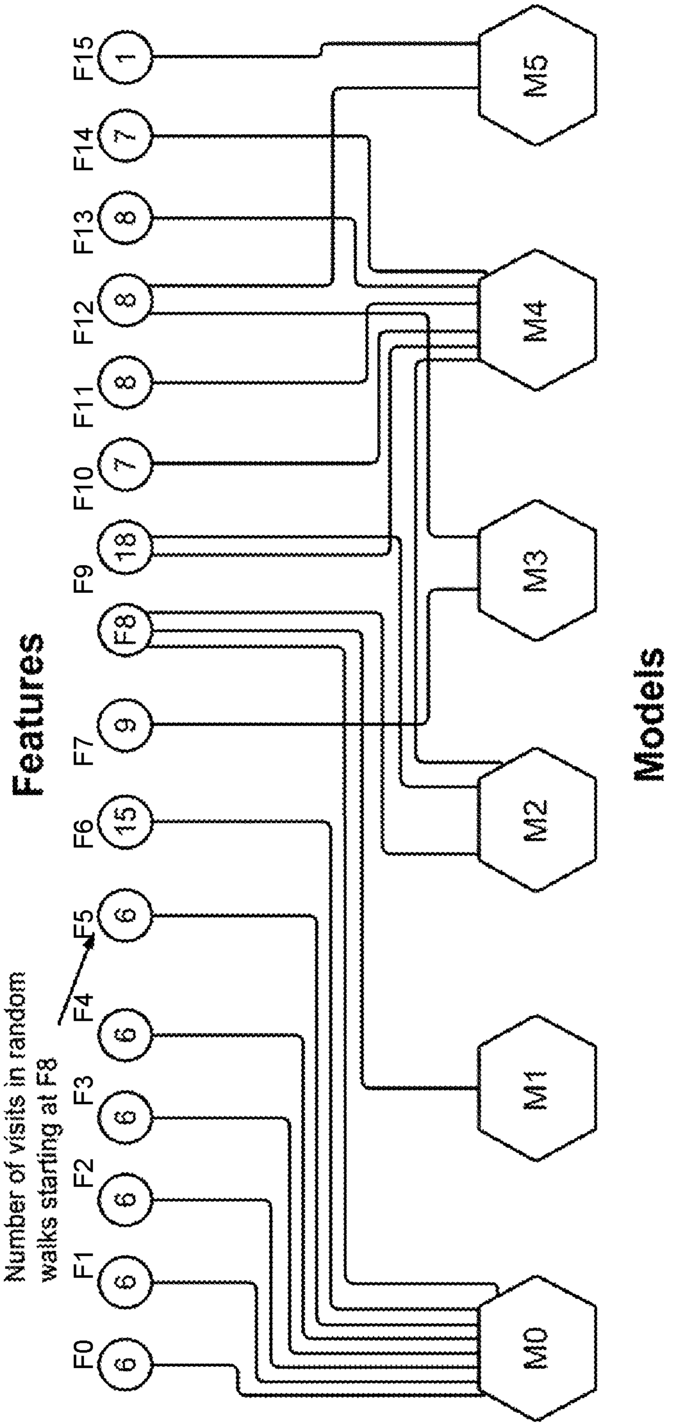
FIG. 5 illustrates an example result of performing the Random Walk method from a node corresponding to a proposed feature, in accordance with one or more embodiments.

FIG. 5 illustrates an example result of performing the Random Walk method from a node corresponding to feature F8 in the graph 220 of FIG. 3. Assuming that a user enters feature F8 as a proposed feature to be used in a new ML model, the candidate feature identification module 250 performs random walks, starting from node corresponding to feature F8. For each of the feature nodes F0-F15, a counter is initiated to count a total number of visit during the random walks. For each feature node F0-F5, a count of 6 is recorded. For feature node F6, a count of 15 is recorded. For feature node F7, a count of 9 is recorded. For feature node F9, a count of 18 is recorded. For each feature node F10 or F14, a count of 7 is recorded. For each feature node F11-F13, a count of 8 is recorded. For feature node F15, a count of 1 is recorded. The counts may be used as a relevancy score between the proposed feature and the features corresponding to the randomly visited feature nodes.

In some embodiments, the candidate feature identification module 250 selects the features with counts greater than a predetermined threshold. For example, if the threshold is 10, features F6 (with a count of 15) and F9 (with a count of 18) are selected. Alternatively, or in addition, the candidate feature identification module 250 ranks the features based on their counts, and select a top predetermined number of features. for example, if the predetermined number is 3, features F5 (with a count of 15), F7 (with a count of 9), and F9 (with a count of 18) are selected.

Example Method of Recommending Features Based on Feature-Model Relation Graph

Figure 6:
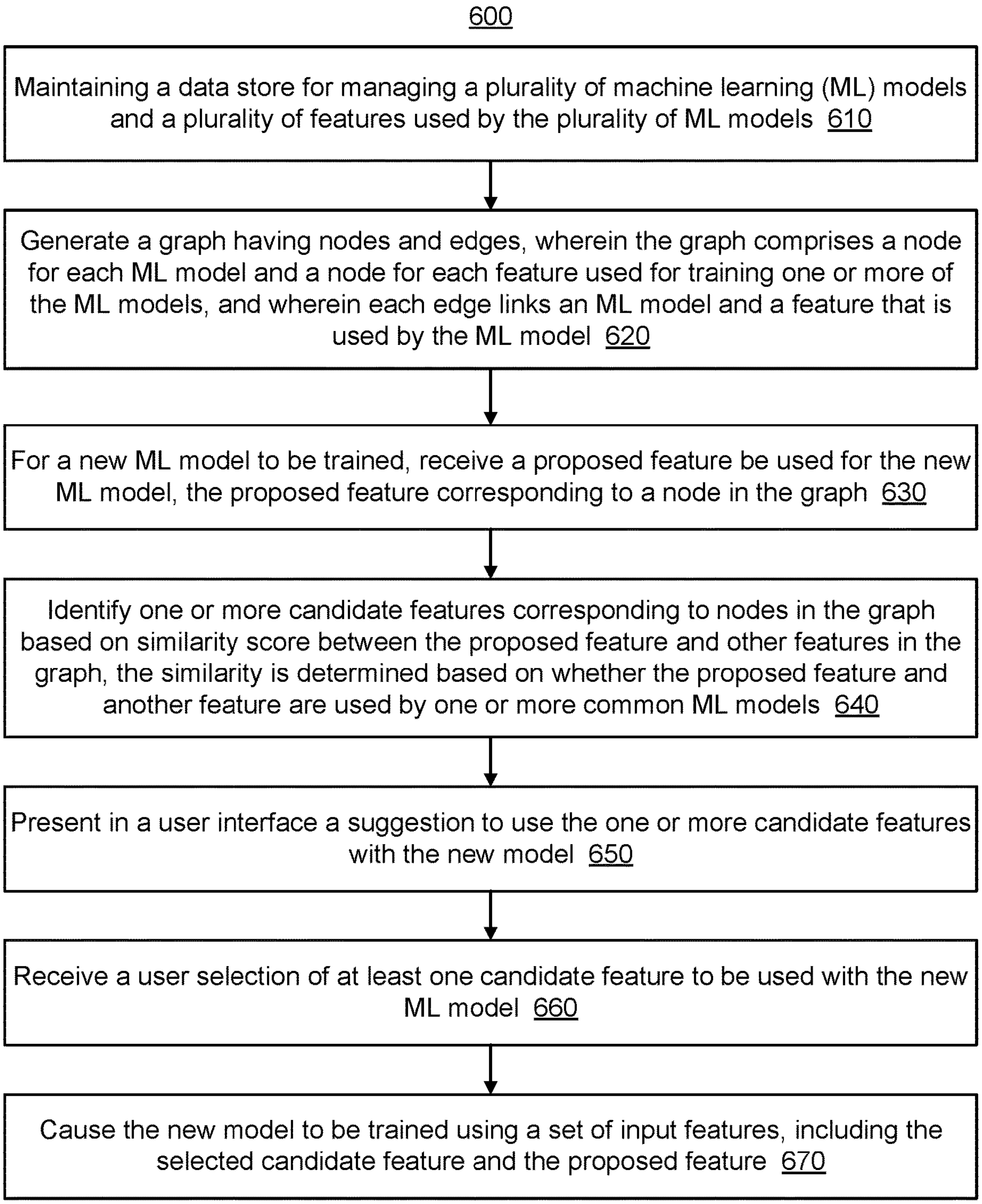
FIG. 6 is a flowchart for a method of recommending features based on feature-model relation, in accordance with one or more embodiments.

FIG. 6 is a flowchart for a method 600 of recommending features based on a feature-model relation graph, in accordance with some embodiments. Alternative embodiments may include more, fewer, or different steps from those illustrated in FIG. 6, and the steps may be performed in a different order from that illustrated in FIG. 6. These steps may be performed by a feature management system (e.g., feature management system 100). Additionally, each of these steps may be performed automatically by the feature management system without human intervention.

The feature management system 100 maintains 610 a data store (e.g., data store 130) for managing a plurality of ML models and a plurality of features used by the plurality of ML models. The feature management system 100 generates 620 a graph (e.g., graph 220) having nodes and edges. the graph includes a node for each ML model, and a node for each feature used for training one or more of the ML models. Each edge links an ML model and a feature that is used by the ML model.

For a new ML model to be trained, the feature management system 100 receives 630 a proposed feature to be used for the new ML model. In some embodiments, the feature management system 100 provides a user interface allowing a user to input one or more proposed features. For example, the user interface may present a feature catalog to the user, and the user can select one or more features from the feature catalog as proposed features. Alternatively, or in addition, the user interface may present the graph 220 (or a portion of the graph 220) to the user, and the user can select one or more features from the graph 220 as proposed features.

The feature management system 100 identifies 640 one or more candidate features from the graph based on relevancy scores between the proposed feature and other features in the graph. In some embodiments, the feature management system 100 generates a model-feature interaction matrix (e.g., model-feature interaction matrix 240), and records relevancy scores between feature pairs in the model-feature interaction matrix. In some embodiments, the feature management system 100 identifies a row or a column in the matrix corresponding to the proposed feature, and traverses the row or the column to obtain relevancy scores between the proposed feature and other features in the graph. The feature management system 100 then identifies candidate features with sufficiently high relevancy scores. For example, in some embodiments, the feature management system 100 identifies candidate features with relevancy scores that are greater than a threshold score. Alternatively, or in addition, in some embodiments, the feature management system 100 identifies a threshold or maximum number of candidate features with the highest relevancy scores among all the features. In some embodiments, the user may input more than one proposed feature. For each of the proposed features, the feature management system 100 may identify a separate set of candidate features.

In some embodiments, the feature management system 100 uses a Random Walk method to compute relevancy scores. A random walk starts from a feature node corresponding to the proposed feature, and randomly walks to a neighboring node. Generally, each feature node can only randomly walks to a model node, and each model node generally can only randomly walks to a feature node. The feature management system 100 may set a threshold distance for the random walk and/or set a threshold number of random walks to be performed from the node corresponding to the proposed feature. Each time, a feature node is visited during a random walk, the visit is recorded as a count for that feature node. At the end of the random walk(s), a set of feature nodes are visited, and each of these feature nodes corresponds to a total number of visits, which may be used as a relevancy score. A greater number of visits generally corresponds to a greater relevancy.

The feature management system 100 presents 650 in a user interface a suggestion to use the one or more candidate features with the new ML model. In some embodiments, the user interface may present the candidate features based on their relevancy scores. When more than one proposed feature is input by the user, more than one sets of candidate features may be presented to the user. The user interface may present the different sets of candidate features in different color, or organize them in different groups. In some embodiments, the user interface may present the graph to the user, with the candidate features highlighted in the graph.

In some embodiments, the user may select any number of candidate features from the user interface. Responsive to receiving 660 a user selection of at least one candidate feature to be used with the new ML model, the feature management system 100 causes 670 the new ML model to be trained using a set of input features. The set of input features includes the selected candidate feature and the proposed feature. Alternatively, the feature management system 100 automatically causes the new ML model to be trained using all the candidate features and the proposed feature(s).

Using Metadata about Models to Recommend Features

The above-described methods focus on model-feature interactions, but not other direct properties of features and models. Additional and/or different methods may be implemented to further consider metadata about features and models. In some embodiments, metadata about features and models are collected. Metadata about features include (but are not limited to) feature_id, name, type, value, the lineage from raw data transformed into features, creator, a list of models that use this feature, list of metrics improved by models included in this feature, and extra description of the feature. Metadata about models include (but are not limited to) model_id, name, owner, model_type, related experiments, a list of products powered this model, a list of features used in this model, list of metrics improved by this model, and extra description of the model. Such metadata can be leveraged to identify candidate features.

Figure 7:
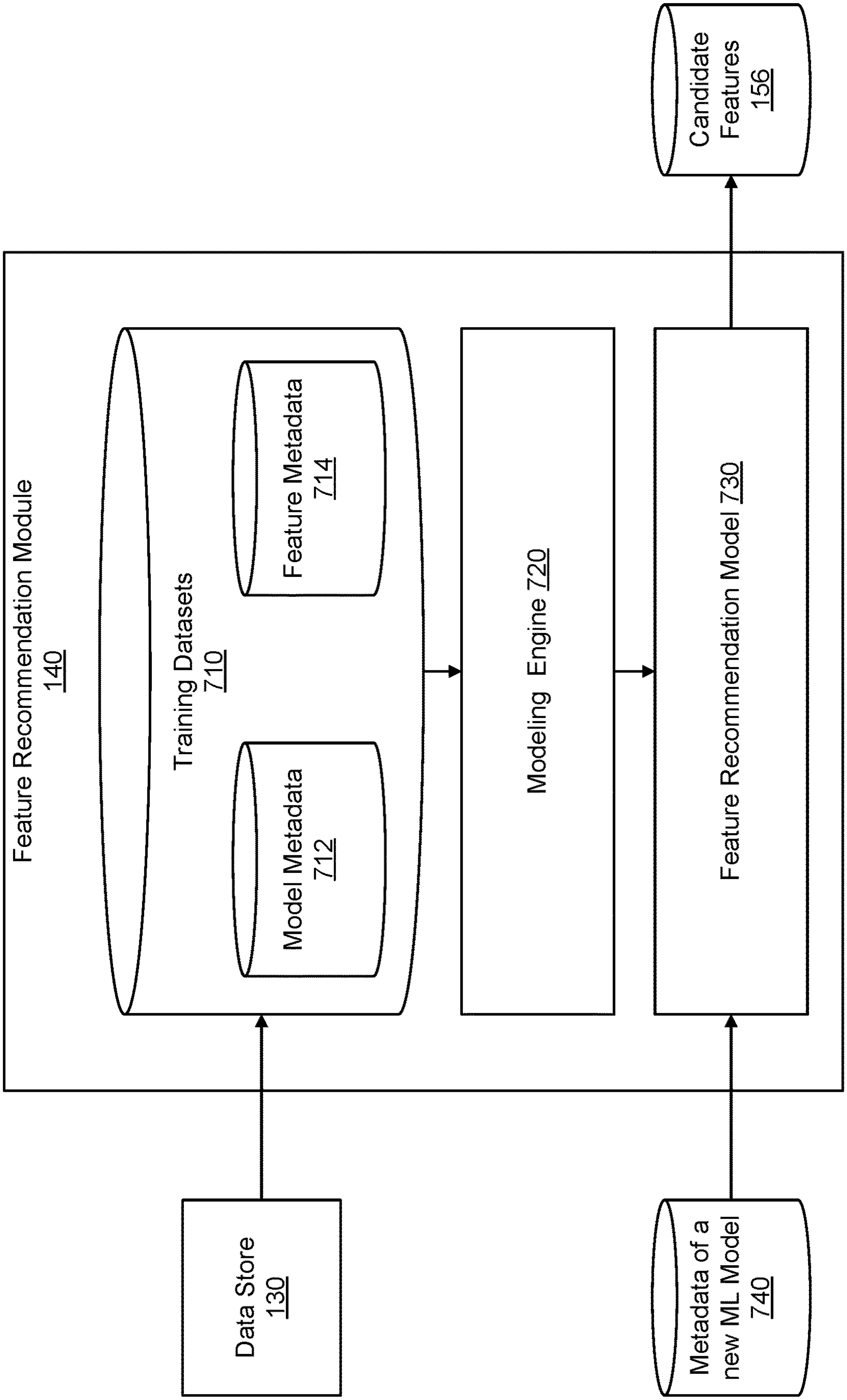
FIG. 7 illustrates another example embodiment of the feature recommendation module, in accordance with one or more embodiments.

In some embodiments, machine learning is used, and the metadata properties of the ML models and/or features are input to a ML model. FIG. 7 illustrates an example embodiment of the feature recommendation module 140. The feature recommendation module 140 includes training datasets 710 and modeling engine 720. The training datasets 710 may be obtained from data store 130. The training datasets 710 includes model metadata 712 (which is metadata about the plurality of ML models stored in data store 130) and feature metadata 714 (which is metadata about the plurality of features stored in data store 130). The modeling engine 720 uses the training datasets 710 to train a ML feature recommendation model 730. The feature prediction model 730 is trained to receive, as input, metadata about a new ML model 740 and one or more proposed features 270 to output one or more candidate features 156.

There is no limitation on the types of machine learning used by the modeling engine 720. Simple linear models, tree-based models, deep neural networks (DNN), multi-tower neural networks, and state-of-the art natural language processing (NLP) models can all be used. Examples of a DNN, a two-towered neural network, and a sentence transformer based two-tower neural network are further described.

DNN Architecture

DNNs can be used for training the feature prediction model 730. The feature recommendation task can be treated as a multiclass/multilabel prediction tasks in which the input is model metadata, and the output is the probability vector with a size equal to the number of available features in the feature management system 100. The training data includes a plurality of existing ML models, each of which is label is labeled with a binary vector with a size equal to the number of the available features. Each binary vector represents whether each of the plurality of features was used in the corresponding model.

Figure 8:
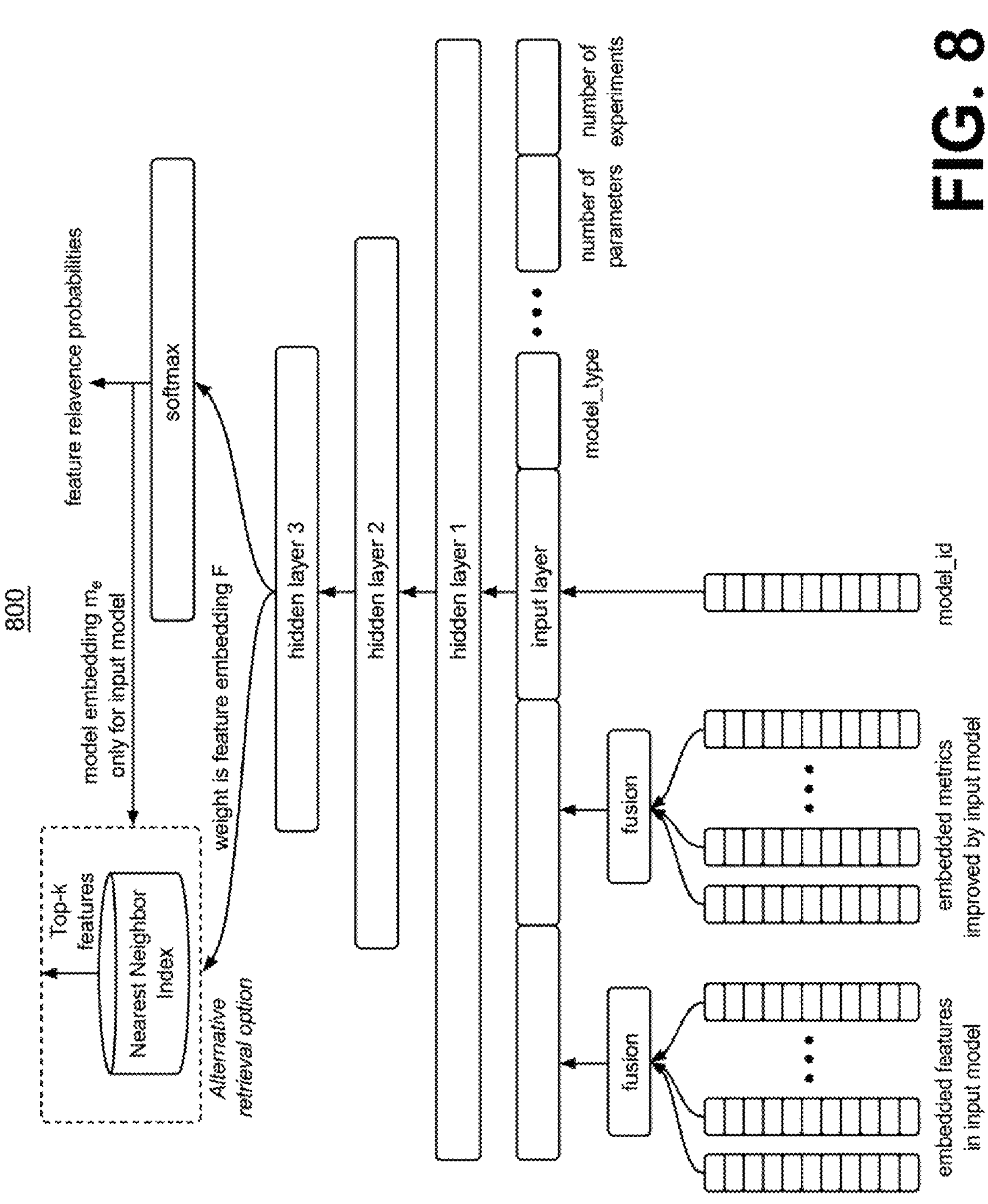
FIG. 8 illustrates an example architecture of a deep neural network (DNN) model for training a feature prediction model, in accordance with one or more embodiments.

FIG. 8 illustrates an example architecture of a DNN model 800, in accordance with one or more embodiments. The output of the DNN model 800 is a vector that represents the relevance probability of the input model to all available features. The vector can be treated as embedding for the input model $m_e$. The DNN model 800 also learns the embedding for all features F. In embodiments, the DNN includes a softmax layer, and the weight of the softmax layer is the embedding matrix F.

The DNN model 800 can be used in different ways. In some embodiments, the output probability of the DNN model 800 can be directly used to decide relevant features to recommend. Alternatively, or in addition, the representation vectors for features and models generated from the DNN model 800 can be used to build index for nearest neighbors. Approximated nearest neighbor (ANN) search can be used to find top-k features that are most relevant to an input model.

Two-Tower Model Architecture

The DNN model 800 described above generates feature vector F for all features, but for model embedding, it only generates the embedding vector $m_e$ for the input model. Unlike the DNN model 800, a two-tower model architecture is able to generate complete embeddings for both features and models.

Figure 9:
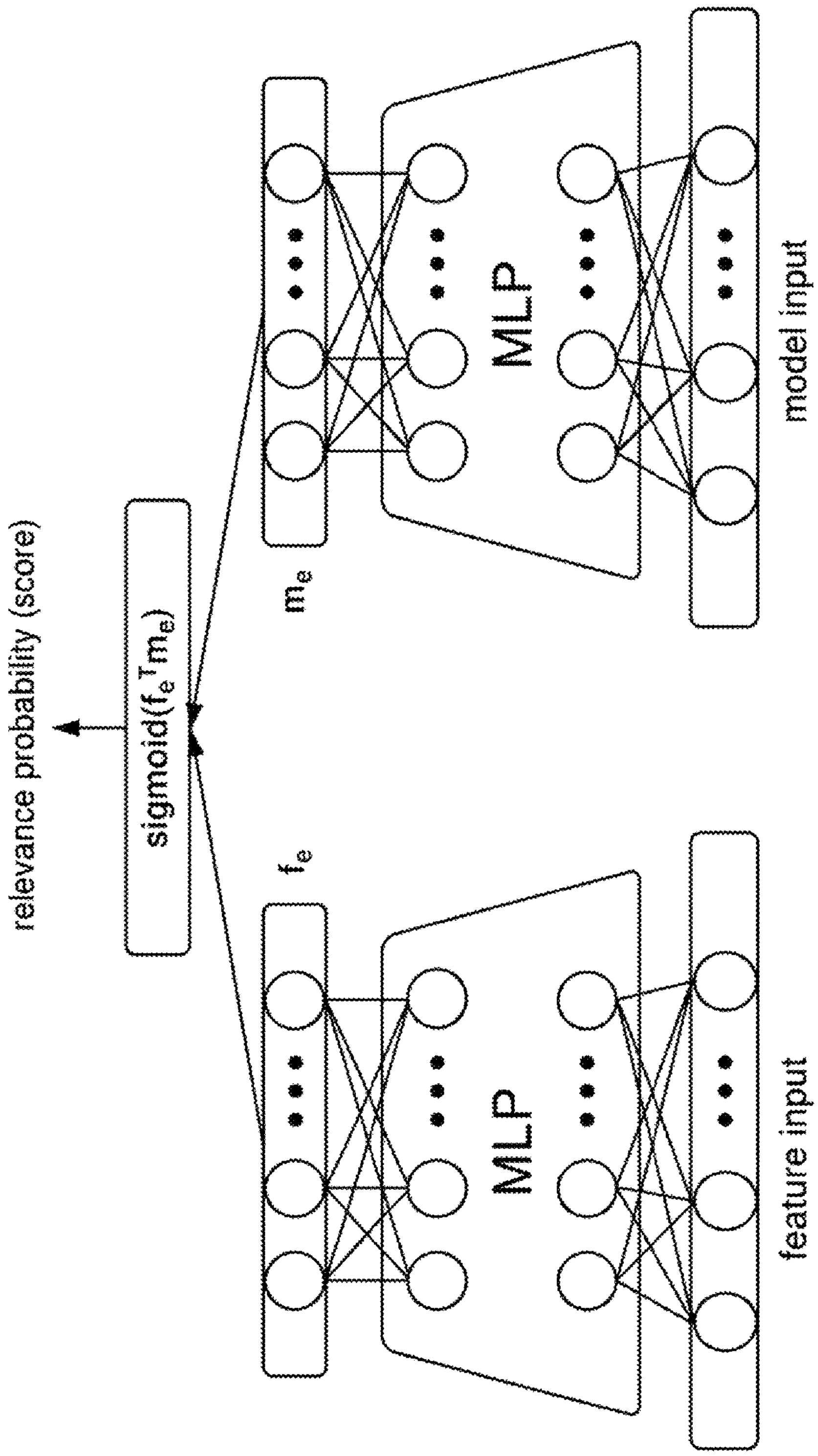
FIG. 9 illustrates an example architecture of a two-tower neural network model for training a feature prediction model, in accordance with one or more embodiments.

FIG. 9 illustrates an example architecture of a two-tower model 900, in accordance with one or more embodiments. As illustrated, the two-tower model 900 includes two identical network structures (also referred to as "two towers"), namely a feature tower and a model tower. The feature tower takes feature metadata as input to generate feature embeddings $f_e$, and the model tower takes model metadata as input to generate a model embedding $m_e$.

In some embodiments, relevant metrics (such as dot product) are used to measure the relevance generated feature and model embedding. The two-tower model 900 predicts one value per (feature, model) pair instead of a probability vector for each model input as that in DNN model 800. After both feature embeddings F and model embeddings M are generated, the ANN algorithms can also be used to find top-k features for each model for recommendation.

Two-Tower Model Architecture with Sentence Transformer

In some embodiments, sentence transformers can also be used for training a ML model for feature recommendation. In order to use a sentence transformer, the feature and model metadata needs to be pre-processed to convert them into sentences. Table 1 (below) shows an example set of special tokens defined for preprocessing feature metadata, in accordance with one or more embodiments.

TABLE 1

| | |
|---|---|
| [FNM] | Indicates next words are feature name |
| [FTY] | Indicates next words are feature type |
| [FPY] | Indicates next words are feature generation pipeline type |
| [FSN] | Indicates next words are feature source name |
| [FCT] | Indicates next words are feature creation team |
| [FML] | Indicates next words are a list of model names that include this feature |

An example sentence generated by a set of feature metadata may be: [FNM] last k searches [FTY] list of string [FPY] real-time [FSN] search results [FCT] search [FML] autocomplete, in-session recommendation, contextual sp recommendation.

Table 2 (below) shows an example set of special tokens defined for preprocessing model metadata, in accordance with one or more embodiments.

TABLE 2

| | |
|---|---|
| [MNM] | Indicates next words are model name |
| [MTY] | Indicates next words are model type |
| [MPC] | Indicates next words are number of parameters in this model |
| [MCT] | Indicates next words are model creation team |
| [MEL] | Indicates next words are list of experiments ran for this model |
| [MPL] | Indicates next words are list of products powered by this model |
| [MML] | Indicates next words are list of metrics positively improved by this model |
| [MFL] | Indicates next words are a list of features used in this model |

An example sentence generated by a set of model metadata may be: MNM] autocomplete ranking [MTY] prediction [MPC] 16328 [MCT] search ml [MEL] ranking with embedding, ranking relevance [MPL] Instacart Apps [MML] cart_adds_per_search, search_conversion_reate, gmv_per_user [MFL] ac_conversion_rate, ac_skip_rate, is_start_match, is_fuzzy_match, has_thumnail, normalized_popularity, last_k_searches.

Figure 10:
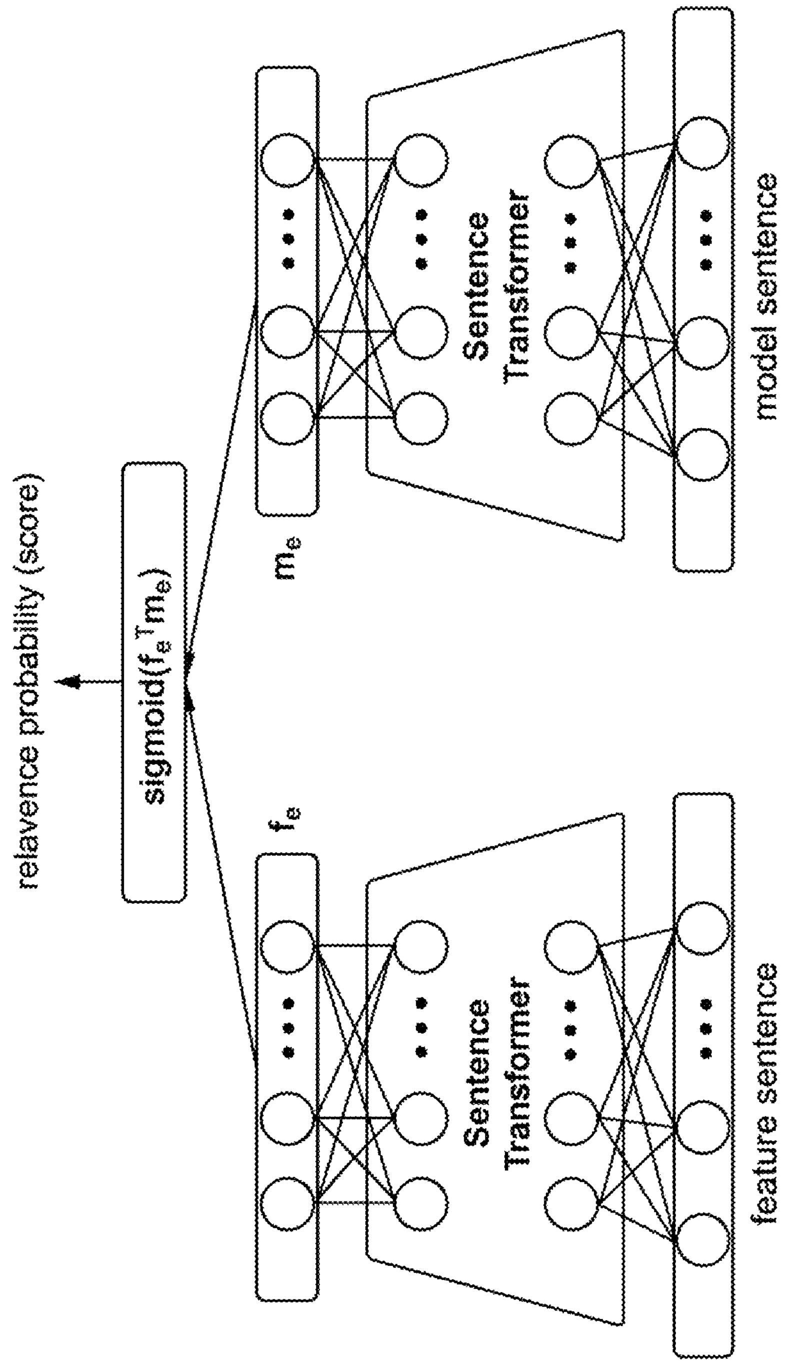
FIG. 10 illustrates an example architecture of a sentence transformer based two-tower neural network model for training a feature prediction model, in accordance with one or more embodiments.

FIG. 10 illustrates an example architecture of a sentence transformer based two-tower model 1000. The difference between the two-tower model 1000 and the two-tower model 900 is that the two-tower model 1000 uses NLP techniques to generate embeddings. The feature and model metadata are converted into sentences to fit the data format requirements. In some embodiments, a pre-trained sentence transformer model may be used as a starting point, the pre-trained sentence transformer model is fine-tuned with the dataset created from the feature/model metadata in the feature management system. A core network in each of the two towers is a sentence transformer. Similarly, after both feature embeddings F and model embeddings M are generated, the ANN algorithms can be used to find top-k features for each model for a recommendation.

In some embodiments, the features determined from the DNN model 800, or the two-tower model 900 or 1000 can be ranked, and the ranked features are then presented to a user. Alternatively, or in addition, the features can be directly recommended as an additional feature set for the input model.

Example Method of Using Trained Feature Prediction Model to Recommend Features

Figure 11:
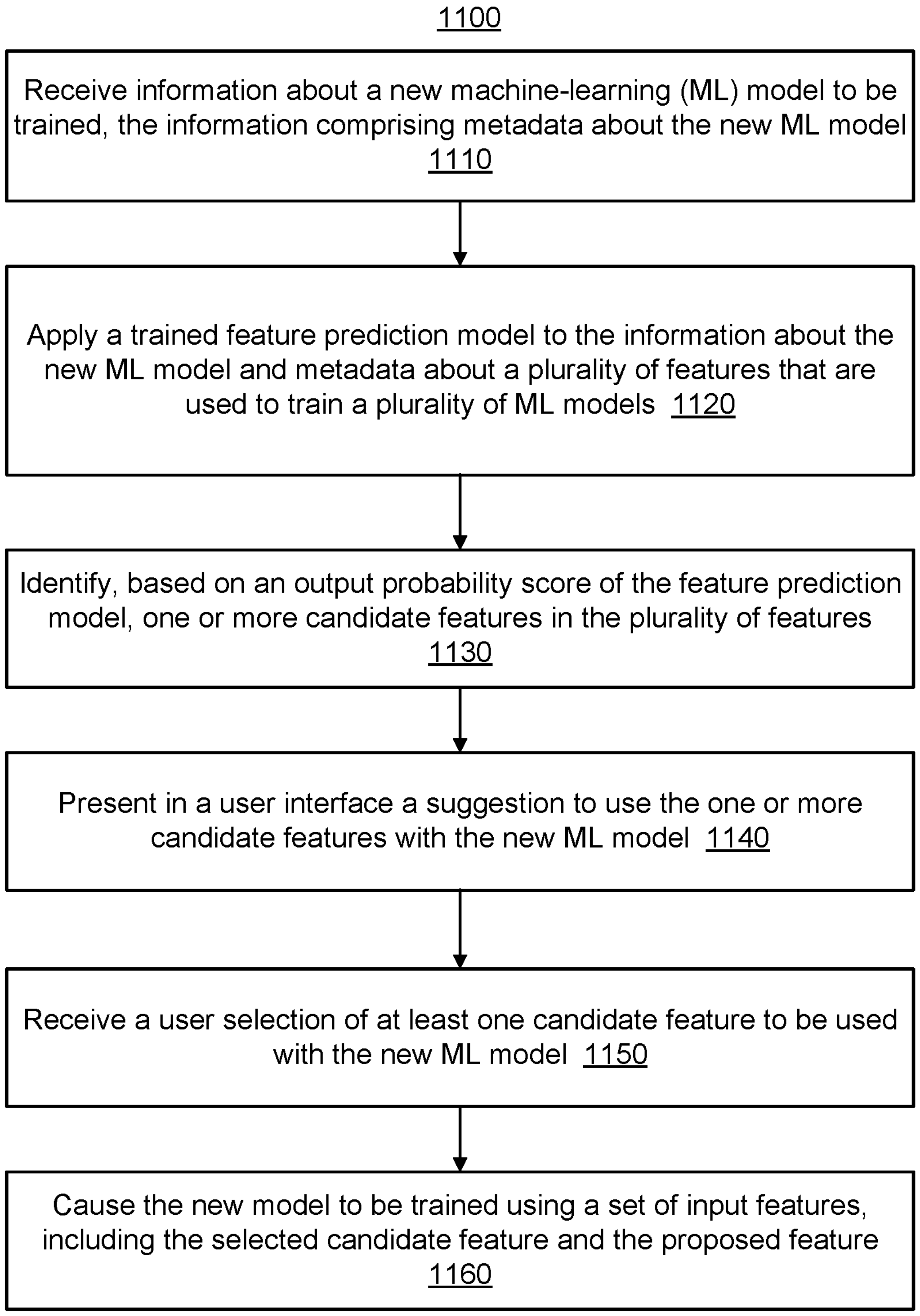
FIG. 11 illustrates a flowchart of a method of using a trained feature prediction model to recommend features, in accordance with one or more embodiments.

FIG. 11 illustrates an example method 1100 of using a trained feature prediction model to recommend features for a new ML model, in accordance with one or more embodiments. Alternative embodiments may include more, fewer, or different steps from those illustrated in FIG. 11, and the steps may be performed in a different order from that illustrated in FIG. 11. These steps may be performed by a feature management system (e.g., feature management system 100). Additionally, each of these steps may be performed automatically by the feature management system without human intervention.

The feature management system 100 receives 1110 information about a new ML model to be trained. The information includes metadata about the new ML model. For example, when a user wants to train a new ML, the user may register metadata bout the new ML model in the feature management system 100.

The feature management system 100 applies 1120 a trained feature prediction model to the information about the new ML model. The feature prediction model is trained to predict a probability that each of a plurality of features should be selected as an input feature for the new ML model. In some embodiments, the training data of the feature prediction model includes a plurality binary vectors, each representing the plurality of features used in a ML model.

In some embodiments, the feature prediction model may be or includes a DNN network (e.g., DNN model 800) trained using a training dataset containing metadata about a plurality of ML models and metadata about a plurality of features used to train the plurality of ML models. The metadata may include (but is not limited to) model_id, name, owner, model_type, related experiments, a list of products powered this model, a list of features used in this model, list of metrics improved by this model, and extra description of the model. In some embodiments, the metadata about the features includes (but is not limited to) feature_id, name, type, value, the lineage from raw data transformed into features, creator, a list of models that use this feature, list of metrics improved by models included in this feature, and extra description of the feature.

In some embodiments, the feature prediction model may be or includes a two-tower network (e.g., two-tower model 900). The two tower network includes a feature tower and a model tower. The feature tower takes metadata about a feature as input to generate feature embedding, and the model tower takes metadata about the new model as input to generate model embedding. The feature embedding and the model embedding are then sent to an output layer of the two tower model (which may be a sigmoid layer) as input to generate a probability score for the feature-model pair. The probability score indicates a probability of the feature should be used as a input feature for the new ML model.

In some embodiments, the two-tower network is a sentence transformer based two-tower network (e.g., sentence transformer based two-tower model 1000). The sentence transformer based tow-tower network also includes a feature tower and a model tower. Each of the feature tower and model tower includes a sentence transformer configured to receive a sentence generated by metadata of a feature or metadata of the new ML model.

The feature management system 100 identifies 1130, based on an output probability score of the feature prediction model, one or more candidate features in the plurality of features. The feature management system 100 presents 1140 in a user interface a suggestion to use the one or more candidate features with the new ML model. In Some embodiments, the output of the feature prediction model (e.g., DNN model 800) includes a vector that represents the probabilities of the new ML model to all available features. The vector is presented to the user. Alternatively, or in addition, in some embodiments, the probabilities in the vector are sorted, and only the features corresponding to the top-k probabilities are presented to the user. In some embodiments, the feature management system 100 builds an index for nearest neighbors and uses approximated nearest neighbor (ANN) search to find top-k features that are most relevant to the new ML model.

The user can select one or more of the candidate features from the user interface. Responsive to receiving 1150 a user selection of at least one candidate feature to be used with the new ML model, the feature management system 100 causes 1160 the new model to be trained using a set of input features, including the selected candidate feature and the proposed feature.

Note, the different methods for recommending features described herein may be used in combination. For example, a user may input metadata of a new ML model and one or more proposed features. The feature recommendation module 140 may suggest a first of candidate features based on the proposed features using the methods described with respect to FIGS. 1-6, and suggest a second set of candidate features based on the metadata of the new ML model using the methods described with respect to FIGS. 7-11. In some embodiments, the feature recommendation module 140 may merge the first set of candidate features and the second set of features and rank the merged set of candidate features, and presenting the ranked candidate features to the user. In some embodiments, the feature recommendation module 140 may compare the first set of candidate features with the second set of features, identify a joint set of candidate features, and give the joint set of candidate features a higher ranking or priority. Alternatively, the feature management system may only present to the user the joint set of candidate features.

In the feature management system, the plurality of ML models may be retrained, and new features may be added to the data store 130. The data and/or metadata associated with the ML models and features may change as time passes. The feature management system 100 may update the graph 220 and/or the feature prediction model 730 periodically, or responsive to changes to the relevant data. As such, the feature management system 100 dynamically improves the feature recommendation module 140 automatically.

Additional Considerations

The foregoing description of the embodiments has been presented for the purpose of illustration; many modifications and variations are possible while remaining within the principles and teachings of the above description. Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the ML model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, implemented at a computer system comprising a processor and a computer-readable medium, the method comprising:

maintaining a data store for managing a plurality of machine learning (ML) models and a plurality of features that are used by the plurality of ML models;

generating a graph having nodes and edges, wherein the graph comprises a node for each ML model and a node for each feature used for training one or more of the ML models, and wherein each edge links an ML model and a feature that is used by the ML model;

generating a model-feature interaction matrix based on the graph, wherein the model-feature interaction matrix includes a relevancy score for pairs of features based on a number of edges in the graph with a model in common;

decomposing the model-feature interaction matrix into a model matrix and a feature matrix, wherein each row i of the model matrix is a vector representation of model i, and each row j of the feature matrix is a vector representation of feature j;

for a new ML model to be trained:

receiving a proposed feature to be used for the new ML model, the proposed feature corresponding to a node in the graph;

identifying one or more candidate features corresponding to nodes in the model matrix and feature matrix based in part on relevancy scores between the proposed feature with other features corresponding to nodes in the model matrix and feature matrix, wherein each relevancy score is determined based on a distance between two vector representations of the features in a pair;

presenting in a user interface a suggestion to use the one or more candidate features with the new ML model; and selecting at least one candidate feature from the one or more candidate features to be used with the new ML model; and causing the new ML model to be trained using a set of input features, the set of input features including the selected candidate feature and the proposed feature.

2. The method of claim 1, wherein identifying the one or more candidate features comprises selecting the one or more candidate features with relevancy scores greater than a threshold score.

3. The method of claim 1, wherein identifying the one or more candidate features comprises selecting a predetermined number of candidate features with highest relevancy scores.

4. The method of claim 1, wherein identifying the one or more candidate features from the graph comprises:

performing one or more random walks from a node corresponding to the proposed feature to neighboring nodes;

for each neighboring node that is visited during the random walks, recording a total number of visits; and identifying the one or more candidate features from the visited neighboring nodes based on the total number of visits.

5. The method of claim 4, wherein identifying the one or more candidate features comprises selecting the one or more candidate features with a total number of visits greater than a threshold number.

6. The method of claim 4, wherein identifying the one or more candidate features comprises selecting a predetermined number of candidate features with highest total number of visits.

7. A non-transitory computer-readable medium having instructions encoded thereon that, when executed by a processor, cause the processor to:

maintain a data store for managing a plurality of machine learning (ML) models and a plurality of features that are used by the plurality of ML models;

generate a graph having nodes and edges, wherein the graph comprises a node for each ML model and a node for each feature used for training one or more of the ML models, and wherein each edge links an ML model and a feature that is used by the ML model;

generate a model-feature interaction matrix based on the graph, wherein the model-feature interaction matrix includes a relevancy score for pairs of features based on a number of edges in the graph with a model in common;

decompose the model-feature interaction matrix into a model matrix and a feature matrix, wherein each row i of the model matrix is a vector representation of model i, and each row i of the feature matrix is a vector representation of feature j;

for a new ML model to be trained:

receive a proposed feature to be used for the new ML model, the proposed feature corresponding to a node in the graph;

identify one or more candidate features corresponding to nodes in the model matrix and feature matrix based in part on relevancy scores between the proposed feature with other features corresponding to nodes in the model matrix and feature matrix, wherein each relevancy score is determined based on a distance between two vector representations of the features in a pair;

present in a user interface a suggestion to use the one or more candidate features with the new ML model; and select at least one candidate feature from the one or more candidate features to be used with the new ML model; and cause the new ML model to be trained using a set of input features, the set of input features including the selected candidate feature and the proposed feature.

8. The non-transitory computer-readable medium of claim 7, wherein identifying the one or more candidate features comprises selecting the one or more candidate features with relevancy scores greater than a threshold score.

9. The non-transitory computer-readable medium of claim 7, wherein identifying the one or more candidate features comprises selecting a predetermined number of candidate features with highest relevancy scores.

10. The non-transitory computer-readable medium of claim 7, wherein identifying one or more candidate features from the graph comprises:

performing one or more random walks from a node corresponding to the proposed feature to neighboring nodes;

for each neighboring node that is visited during the random walks, recording a total number of visits; and identifying the one or more candidate features from the visited neighboring nodes based on the total number of visits.

11. The non-transitory computer-readable medium of claim 10, wherein identifying the one or more candidate features comprises selecting the one or more candidate features with a total number of visits greater than a threshold number.

12. The non-transitory computer-readable medium of claim 10, wherein identifying the one or more candidate features comprises selecting a predetermined number of candidate features with highest total number of visits.

13. A computer system, comprising:

a processor; and a non-transitory computer-readable medium having instructions encoded thereon that, when executed by the processor, cause the processor to:

maintain a data store for managing a plurality of machine learning (ML) models and a plurality of features that are used by the plurality of ML models;

generate a graph having nodes and edges, wherein the graph comprises a node for each ML model and a node for each feature used for training one or more of the ML models, and wherein each edge links an ML model and a feature that is used by the ML model;

generate a model-feature interaction matrix based on the graph, wherein the model-feature interaction matrix includes a relevancy score for pairs of features based on a number of edges in the graph with a model in common;

decompose the model-feature interaction matrix into a model matrix and a feature matrix, wherein each row i of the model matrix is a vector representation of model i, and each row i of the feature matrix is a vector representation of feature i:

for a new ML model to be trained:

receive a proposed feature to be used for the new ML model, the proposed feature corresponding to a node in the graph;

identify one or more candidate features corresponding to nodes in the model matrix and feature matrix based in part on relevancy scores between the proposed feature with other features corresponding to nodes in the model matrix and feature matrix, wherein each relevancy score is determined based on a distance between two vector representations of the features in a pair;

present in a user interface a suggestion to use the one or more candidate features with the new ML model; and select at least one candidate feature from the one or more candidate features to be used with the new ML model; and cause the new ML model to be trained using a set of input features, the set of input features including the selected candidate feature and the proposed feature.

14. The computer system of claim 13, wherein identifying one or more candidate features from the graph comprises:

performing one or more random walks from a node corresponding to the proposed feature to neighboring nodes;

for each neighboring node that is visited during the random walks, recording a total number of visits; and identifying the one or more candidate features from the visited neighboring nodes based on the total number of visits.

* * * * *